United States Patent [19]
Kobayashi

[11] Patent Number: 5,729,518
[45] Date of Patent: Mar. 17, 1998

[54] DIGITAL SIGNAL REPRODUCING APPARATUS AND METHOD FOR CORRECTLY REPRODUCING RECORDED DATA EVEN IF BOTH RANDOM NOISE AND SIGNAL DISTORTION CO-EXIST

[75] Inventor: Seiji Kobayashi, Kanagawa, Japan

[73] Assignee: Sony Corporation, Tokyo, Japan

[21] Appl. No.: 770,589

[22] Filed: Dec. 19, 1996

[30] Foreign Application Priority Data

Dec. 22, 1995 [JP] Japan .................................... 7-350142

[51] Int. Cl.$^6$ .................................................. H04N 5/76
[52] U.S. Cl. ............................................................ 369/59
[58] Field of Search ........................... 369/124, 59, 48, 369/47, 32

[56] References Cited

U.S. PATENT DOCUMENTS 5,583,889  12/1996  Citta et al. ............................ 375/341

OTHER PUBLICATIONS

Journal of Information Processing Society of Japan, vol. 72, No. 3, pp. 306–316, Mar. 1989.
IEEE Transactions on Information Theory, vol. IT–28, No. 1, Jan. 1982 (this document discloses in English the basic method for the above document).

*Primary Examiner*—Nabil Hindi
*Attorney, Agent, or Firm*—Limbach & Limbach L.L.P.

[57] ABSTRACT

Signals corresponding to the front edge and the rear edge of a pit of an optical signal are sampled and thereby a pair of signals Vx and Vy are obtained. Since two-dimensional decoders map all combinations of the low order three bits of six bits of recorded data, they also decode the high order three bits of the recorded data. Estimated value calculating circuits output estimated values Vx' and Vy' corresponding to the decoded outputs. Subtracting devices and square calculating devices calculate the distances (error powers) between real reproduced signals and estimated value. With a plurality of error powers that chronologically vary, a Viterbi decoding circuit generates decoded output data.

4 Claims, 10 Drawing Sheets

Fig. 3
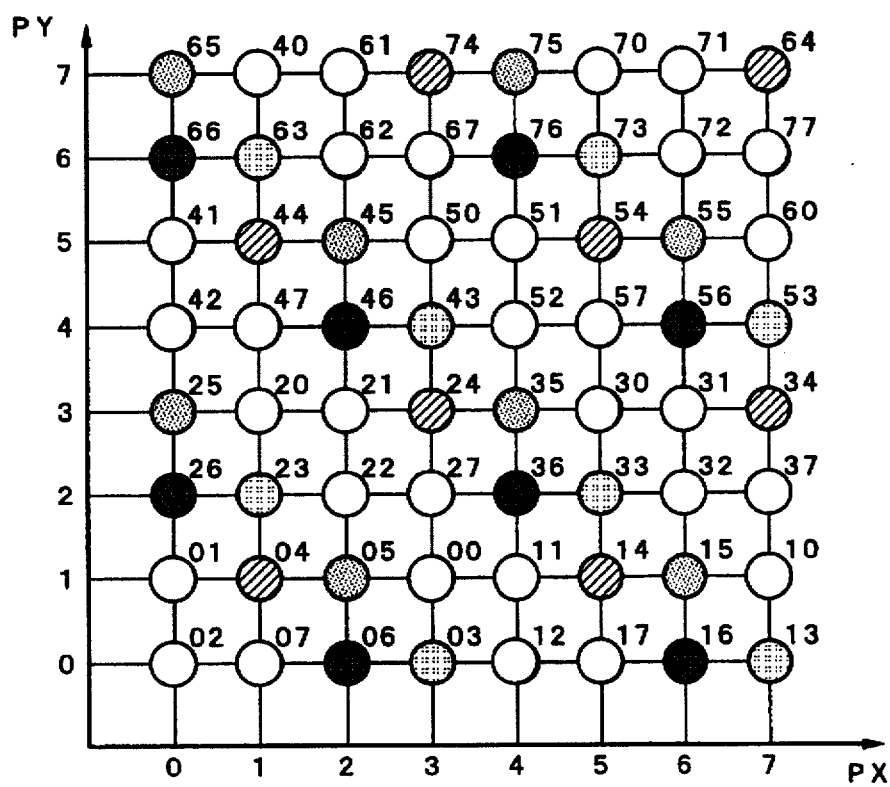
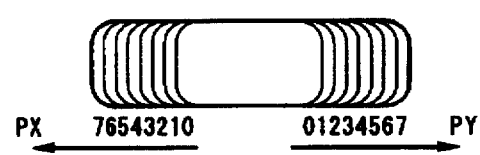
Fig. 4A
| | INPUT DATA | PIT CORRESPONDING TO INPUT DATA |
Fig. 4B  011100  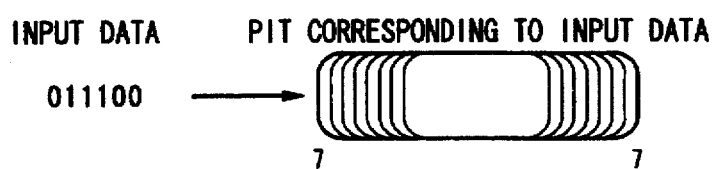
Fig. 4C  001011  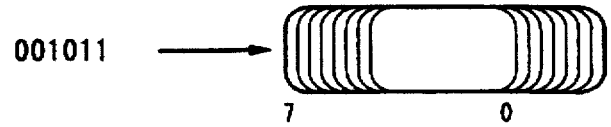

(001)

(010)

(011)

(100)

(101)

(110)

(111)

DIGITAL SIGNAL REPRODUCING APPARATUS AND METHOD FOR CORRECTLY REPRODUCING RECORDED DATA EVEN IF BOTH RANDOM NOISE AND SIGNAL DISTORTION CO-EXIST

BACKGROUND OF THE INVENTION

1. Field of the Invention

The present invention relates to a digital signal reproducing apparatus for reproducing a digital signal that has been recorded with multiple values as for example edge position information of pits and a reproducing method thereof.

2. Description of the Related Art

As a system for recording edges of pits as gradual position changes with multiple values, a practical means has been disclosed in for example U.S. Pat. No. 5,557,592. In a conventional system for recording and reproducing multiple-value information, a technology for removing the influence of noise has been used in a system for recording and reproducing multiple-value information. This technology is called trellis encoding modulation. For example, an outline of such a technology is described in "JOURNAL OF INFORMATION PROCESSING SOCIETY OF JAPAN," Vol. 72, No. 3, pp. 306–316, March 1989. In the trellis encoding modulation, when a signal is recorded, a convolutional code is added. Thus, since combinations of reproduced signals are restricted, a correct signal sequence is estimated with a sequence of a reproduced signal so as to remove the influence of noise or the like. Such a trellis encoding modulation system is especially effective to random disturbance such as noise.

On the other hand, in a real system, while a signal is being recorded or reproduced, the signal may be distorted. The value of a reproduced signal sometimes deviates from the ideal value. An error due to the distortion is always constant as long as information being recorded is the same unlike with an error due to noise. The trellis encoding modulation has an effect against an error due to distortion to some extent. However, since noise should be at random, the effect of removing noise is not sufficient.

OBJECTS AND SUMMARY OF THE INVENTION

Thus, an object of the present invention is to provide a digital signal reproducing apparatus for correctly reproducing recorded data even if both random noise and signal distortion co-exist and a reproducing method thereof.

A first aspect of the present invention is a digital signal reproducing apparatus for reproducing a multiple-value signal recorded on a record medium, comprising a plurality of recorded information assuming means for assuming record information and determining virtually recorded information, a reproduced signal estimating means for estimating the amplitude of a reproduced signal corresponding to the virtually recorded signal, a distance calculating means for calculating the distance between the estimated reproduced signal and a real reproduced signal, and a decoding means for calculating the sum of a plurality of outputs of the distance calculating means, the plurality of outputs chronologically varying, detecting the minimum output from the sum, and outputting reproduced data corresponding to the detected result.

A second aspect of the present invention is a digital signal reproducing method for reproducing a multiple-value signal recorded on a record medium, comprising the steps of assuming recorded information and determining virtually recorded information, estimating the amplitude of a reproduced signal corresponding to the virtually recorded information, calculating the difference between the estimated reproduced signal and a real reproduced signal, and calculating the sum of distances that chronologically differ from each other and that have been calculated, detecting the minimum value from the sum, and outputting reproduced data corresponding to the detected result.

Edge positions of the front edge and rear edge of each pit formed on a recording medium for example an optical disc are modulated with recorded data and the recorded data is recorded as multiple values. When recorded data is reproduced from the optical disc, a reproduced signal is obtained by sampling both edges of a signal corresponding to each pit. In this case, the amplitude of the reproduced signal is estimated corresponding to virtually recorded data. Thus, the distance between the estimated reproduced signal and the really reproduced signal is calculated. When this distance is decoded by maximum likelihood decoding method, the recorded data is decoded.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 3 is a schematic diagram showing an example of mapping of recorded data and pit edge position data;

FIGS. 4A to 4C are schematic diagrams for explaining a multiple-value recording process;

DETAILED DESCRIPTION OF THE PREFERRED EMBODIMENTS

Figure 1:
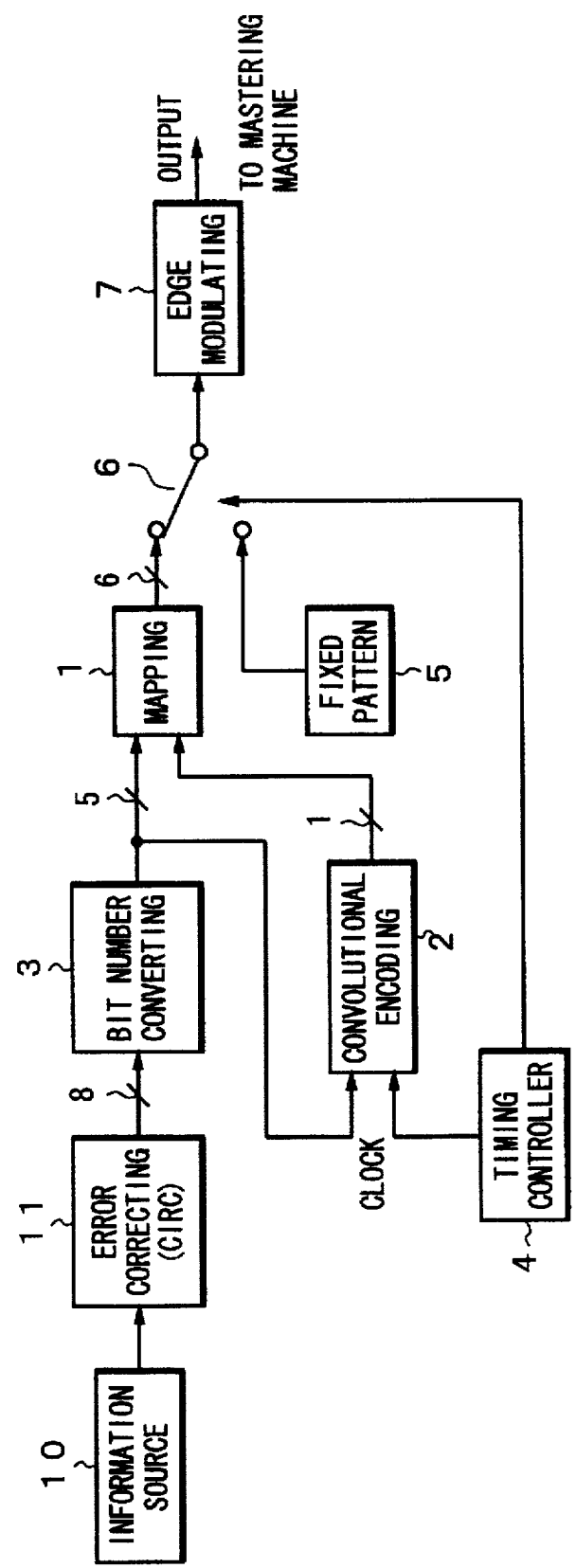
FIG. 1 is a block diagram showing an example of a recording apparatus.

Next, with reference to the accompanying drawings, an embodiment according to the present invention will be described. FIG. 1 shows an example of a recording apparatus that records a digital signal to an optical disc. A digital signal (including a digital audio signal, a digital video signal, and so forth) supplied from an information source 10 is supplied to an error correcting circuit 11.

As with a conventional optical disc, the error correcting circuit 11 adds an error correction code (CIRC) that is Reed-Solomon code to the digital signal supplied from the information source 10. This error correction code is the same as that used in a conventional compact disc (CD). This code is redundantly added so that even if part of a reproduced signal has an error due to a defect of the disc, data can be correctly read. The error correction code is calculated with every eight bits (one byte). Thus, data is output with every eight bits. However, according to the embodiment, since data of five bits is recorded for each pit, eight-bit data is converted into five-bit data by a bit number converting circuit 3.

The bit number converting circuit 3 stores five eight-bit blocks of data (a total of 40 bits) to a register. Thereafter, the bit number converting circuit 3 outputs eight five-bit blocks of data from the register. The output data of the bit number converting circuit 3 is supplied to a mapping circuit 1 and a convolutional code calculating circuit 2. A timing controller 4 supplies a clock signal to the convolutional code calculating circuit 2. The convolutional code calculating circuit 2 calculates a convolutional code and adds the calculated code as the least significant bit of the data sequence. The resultant six-bit block data is supplied to the mapping circuit 1. The mapping circuit 1 maps the six bits and edge positions of the front edge and the rear edge of each pit. Each of the front edge and the rear edge is independently modulated in eight levels. The edge position of the front edge and the rear edge represents three bits. Thus, data of six bits is output from the mapping circuit 1 for each pit.

The six-bit signal is supplied from the mapping circuit 1 to one of two input terminals of a data selector 6. A fixed pattern is supplied from a fixed pattern generating circuit 5 to the other input terminal of the data selector 6. Corresponding to a control signal supplied from the timing controller 4, the data selector 6 is switched at predetermined intervals. Thus, the fixed pattern as a reference signal is inserted between data sequences. When a signal is reproduced from the disc, the state of pits on the disc can be detected corresponding to the reference signal. The clock signal that is a time reference for reproducing data from the disc is reproduced from the reference signal.

The six-bit block signal is supplied from the selector 6 to an edge modulating circuit 7. The edge modulating circuit 7 modulates the edge positions of each pit corresponding to the six-bit block data. The output signal of the edge modulating circuit 7 is supplied to a mastering machine (not shown) and recorded on a glass master disc by a laser beam.

The optical master disc on which data has been recorded is developed in the same manner as the conventional optical master disc. Thereafter, the optical disc is plated and finally a stamper is created. With the stamper, discs are reproduced in the same manner as optical discs such as CDs. Pits are regularly arranged on the front surface of each reproduced disc. Each of the front edge and rear edge of each pit are modulated in eight levels. Thus, one pit represents data of six bits. By recording data with multiple values, the record density is improved.

Figure 2:
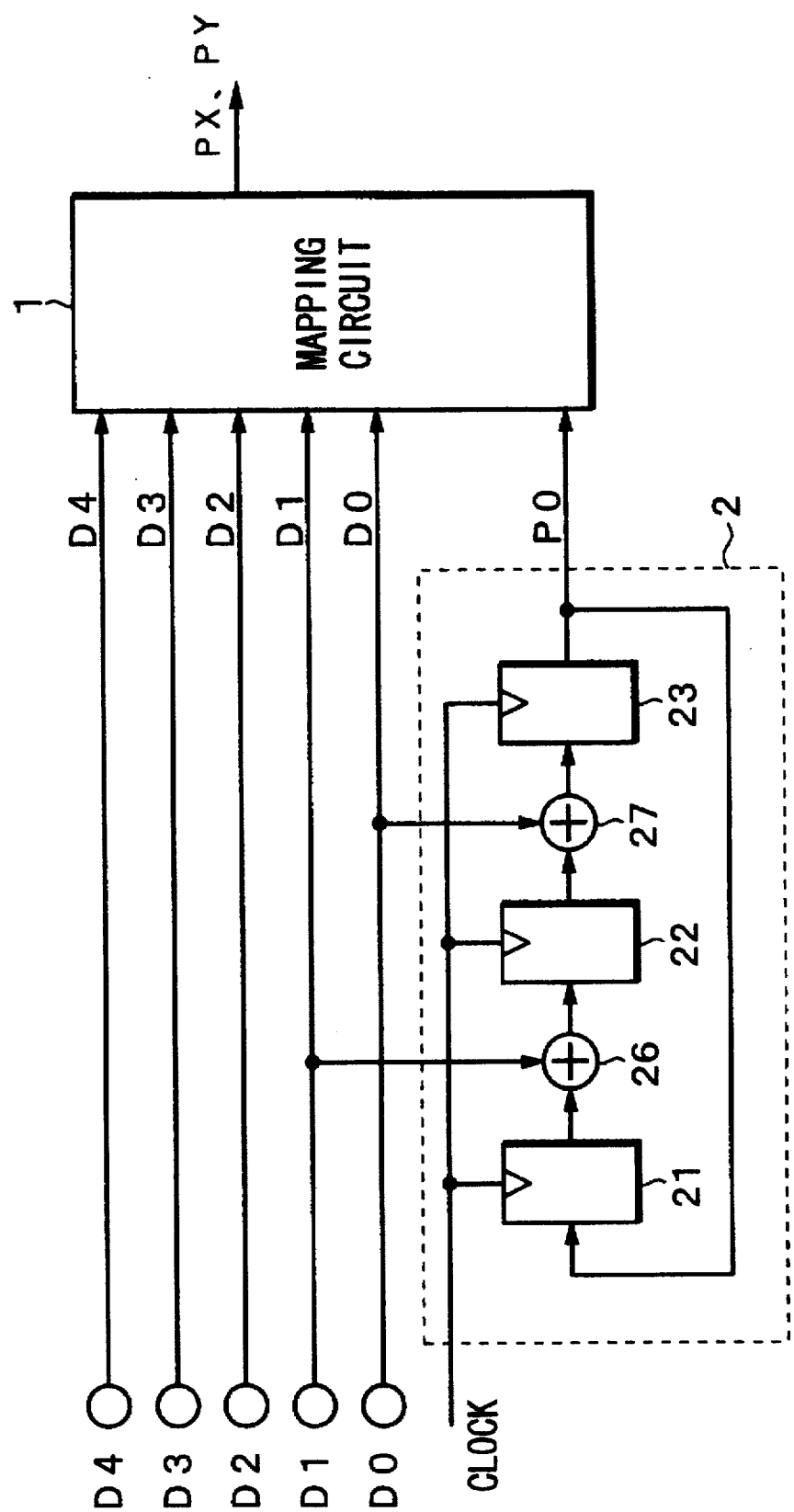
FIG. 2 is a block diagram showing an example of a convolutional code calculating circuit.

FIG. 2 shows an example of the convolutional code calculating circuit 2. In FIG. 2, a portion surrounded by dotted lines represents the block of the convolutional code calculating circuit 2. The convolutional code calculating circuit 2 is composed of three flip-flops 21 to 23 and two exclusive-OR circuits 26 and 27. In FIG. 1, the output of five-bit block data is supplied from the bit number converting circuit 3 to both the mapping circuit 1 and the convolutional code calculating circuit 2. However, actually, as shown in FIG. 2, data used in the convolutional code calculating circuit 2 is only low order two bits (D1 and D0) of the output data of the bit number converting circuit.

The convolutional code calculating circuit 2 calculates a convolutional code P6 for each pit (namely, for each five-bit block data) and outputs the result to the mapping circuit 1. The flip-flop 21 of the three flip-flops changes the state corresponding to the output state of the flop-flop 23 for each pit. The flop-flop 22 changes the state corresponding to the signal state of the output signal of exclusive-OR of the output signal of the flip-flop 21 and the second least significant bit D1 of the bit number converting circuit 2 for each pit. Likewise, the flip-flop 23 changes the state corresponding to the output signal of exclusive-OR of the output signal of the flip-flop 22 and the least significant bit D0 for the bit number converting circuit 2.

Next, the mapping circuit 1 will be described. The mapping circuit 1 inputs five bits D4 to D0 of the bit number converting circuit 3 and one bit P0 of the convolutional code calculating circuit 2 and outputs bit edge position data PX and PY, each of which is composed of three bits. FIG. 3 shows an example of the mapping process. In FIG. 3, numerals 00 to 77 placed on the upper right position of each lattice point represent six-bit input data (D4, D3, D2, D1, D0, and P0) denoted in octal notation (three bits of bit edge position data are represented by 0 to 7). Numerals 0 to 7 denoted on the X and Y axes represent three-bit data PX and PY.

For example, when values of six bits (D4, D3, D2, D1, D0, and P0) of input data are (0, 0, 1, 0, 1, and 1), the input data in octal notation is 13. In this case, the position of which a lattice point is 13 is located and the X and Y coordinates (PX, PY) of the located lattice point become (7, 0). Since the mapping circuit 1 outputs six-bit data against six-bit input data, the mapping circuit 1 can be accomplished with a memory IC such as a ROM.

After the fixed pattern is inserted as reference data, the edge position data PX and PY are input to the edge modulating circuit 7. As shown in FIG. 4A, the position of the front edge of each pit gradually increases corresponding to the value of PX. In addition, the value of the rear edge gradually increases corresponding to the value of PY.

FIG. 4B shows an example of the relation between input data of the mapping circuit 1 and the shape of a pit that is recorded corresponding thereto. In FIG. 4B, recorded data in octal notation is 64. With reference to FIG. 3, the mapping circuit 1 obtains PX=7 and PY=7 corresponding to 64. Thus, both the front edge and rear edge of the pit are set to the largest pit length. In an example shown in FIG. 4C, recorded data in octal notation is 13. In this example, the front edge of the pit is shifted to the maximum position and the rear edge of the pit is set to the shortest position.

Figure 5:
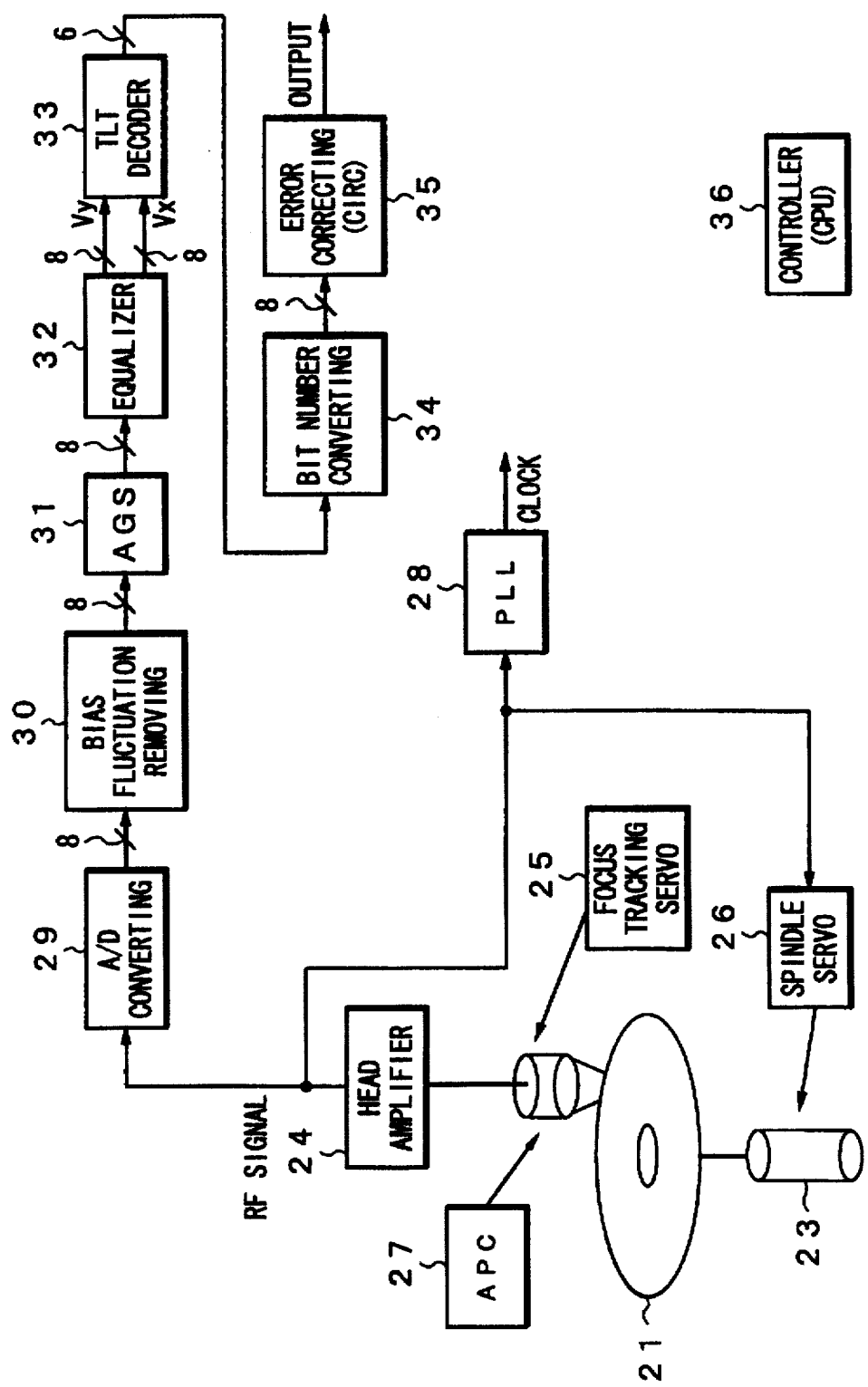
FIG. 5 is an overall block diagram showing a reproducing apparatus according to an embodiment of the present invention.

As was described above, in the present invention, multiple values are recorded as data so that the front edge position and rear edge position of each pitch are modulated. FIG. 5 shows an optical disc reproducing apparatus according to an embodiment of the present invention. In FIG. 5, reference numeral 21 is an optical disc that is reproduced from a master disc on which data has been recorded by the above-described mastering system. Reference numeral 23 is a spindle motor that rotates the optical disc 21 at CLV (Constant Linear Velocity) or CAV (Constant Angular Velocity). An optical pickup 22 radiates a laser beam to the optical disc 21. A photo detector in the optical pickup 22 converts the amount of reflected light to an electric signal and obtains a reproduced RF signal through a head amplifier 24.

The optical pickup 22 is controlled by a servo circuit 25. The spindle motor 23 is controlled by a spindle servo circuit 26. In FIG. 5, the servo circuit 25 is represented as one block. However, the servo circuit 25 includes a focus servo (that allows the optical pickup 22 to be properly focused), a tracking servo (that aligns an optical spot to a correct track), a slide servo (that moves the optical pickup 22 to a proper radius position) and so forth. A focus error signal and a tracking error signal are formed by calculating an output signal of for example a four-divided detector. When necessary, an APC (Automatic Power Controlling) circuit 27 is provided so that the laser power is properly maintained.

The reproduced RF signal is supplied to a PLL circuit 28. The PLL circuit 28 generates a clock signal and supplies it to the entire system. An A/D converter 29 converts the reproduced RF signal from an analog signal into an eight-bit digital signal in synchronization with the clock signal. Thereafter, a bias fluctuation removing circuit 30 and an AGC circuit 31 compensate fluctuations of bias and gain that take place due to various causes in the fabrication step of the disc with the reference signal, which has been periodically recorded between each data. The bias fluctuation removing circuit 30 removes a vertical fluctuation of the entire reproduced signal (namely, the fluctuation of bias) with reference to the level of the reference signal formed between each data. The AGC circuit 31 removes the fluctuation of gain (namely, a fluctuation of the amplitude of the reproduced signal) with reference to the reference signal.

An output signal of the AGC circuit 31 is supplied to an equalizer 32. The equalizer 32 removes an inter-code interference between recorded signals. An output signal of the equalizer 32 is a pair of signals Vx and Vy. The signal Vx is obtained by sampling the front edge of each pit. The signal Vy is obtained by sampling the rear edge of each pit. An output signal of the equalizer 32 is supplied to a TLT decoder 33. As will be described later, the TLT decoder 33 decodes an output signal of the equalizer 32 in such a manner that the influences of signal distortion and random noise are removed with information of convolutional code that has been added to the recorded data. As described above, since the convolutional code is redundant information that has been added to remove the influence of noise and so forth, five-bit information of which the convolutional code has been removed is obtained for each pit.

After the TLT decoder 33 has decoded input data into five-bit block data, a bit number converting circuit 34 converts the five-bit block data into eight-bit block data. This process is accomplished by storing eight five-bit blocks to a shift register and reading five eight-bit blocks therefrom. The bit number converting circuit 34 supplies the eight-bit block data to an error correcting circuit 35. The error correcting circuit 35 removes the influence of defect on the disc. The error correcting circuit 35 outputs reproduced data. To control the operation of the above-described disc reproducing apparatus, a controller (CPU) 36 is disposed.

Next, an example of the structure of the TLT decoder 33 will be described. Signals Vx and Vy of which both edges of each pit have been sampled are input to the TLT decoder 33. The bias fluctuation removing circuit 30 has removed the fluctuation of bias. The AGC circuit 31 has normalized the amplitude of the signal. Thus, since the distortion due to imperfectness of recording system and reproducing system and influence of noise entered due to any cause in the recording process and reproducing process have been removed from the input signals Vx and Vy, they have values corresponding to positions (PX and PY) that are positions of recorded pit edges.

The gain of the AGC circuit 31 and the bias value of the bias fluctuation removing circuit 30 can be set by the designer. However, in the present invention, the bias fluctuation removing circuit 30 and the AGC circuit 31 are designed so that when noise and distortion do not take place, the signals Vx and Vy satisfy the following relations.

$$Vx = 32 \cdot PX + 16 \quad (1)$$

$$Vy = 32 \cdot PY + 16 \quad (2)$$

For example, when a signal is reproduced from a pit of which the positions of the front edge and rear edge (PX and PY) have been recorded as (0 and 7), input signals (Vx and Vy) to the TLT decoder 33 have values (16 and 240). Since the input signals (Vx and Vy) to the TLT decoder 33 are influenced by noise and distortion, these values slightly deviate. The TLT decoder 33 correctly decodes signals that slightly deviate from ideal values.

Figure 6:
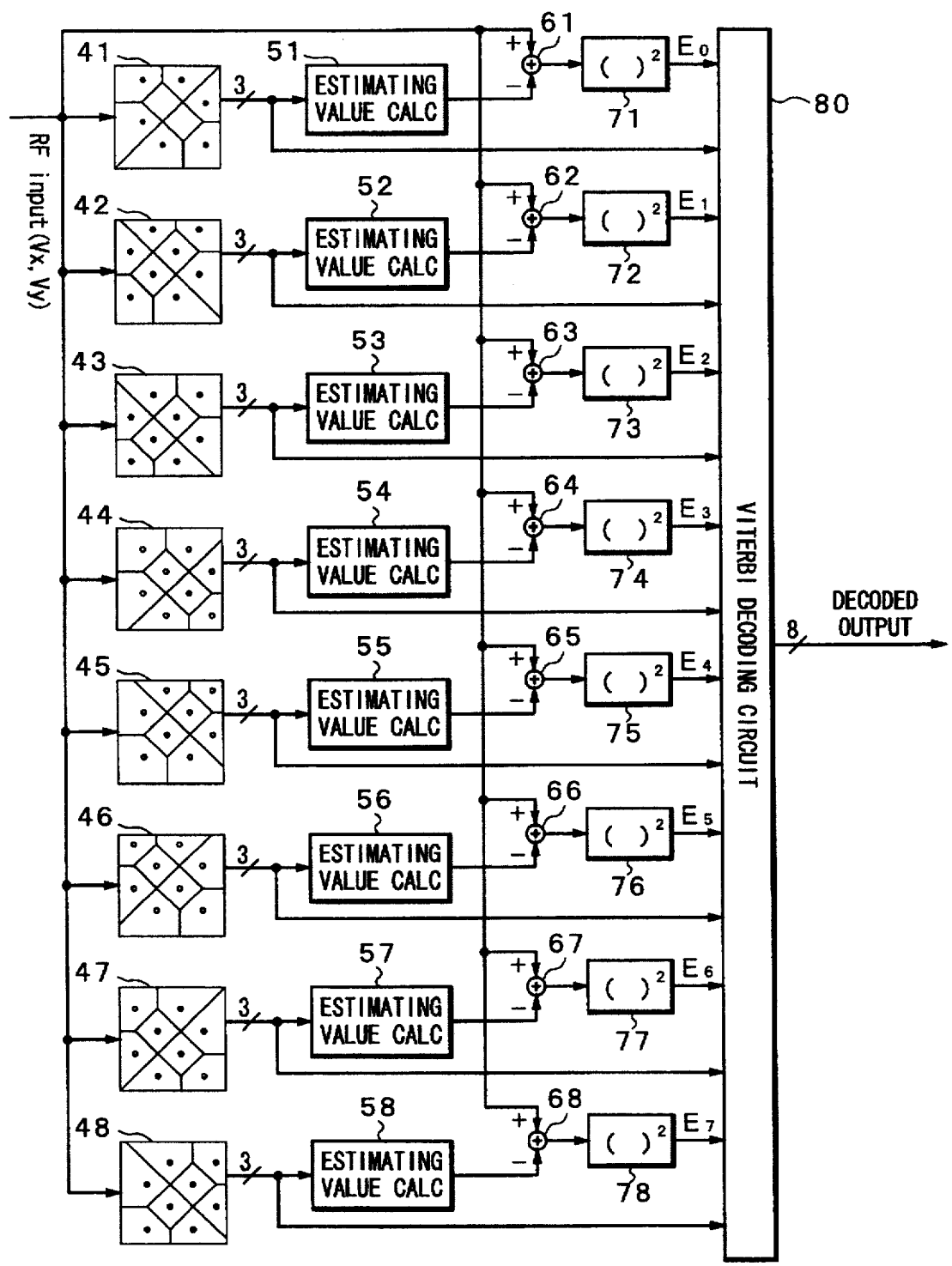
FIG. 6 is a block diagram showing a TLT decoder according to an embodiment of the present invention.

FIG. 6 shows an example of the structure of the TLT decoder 33. Eight two-dimensional decoders 41 to 48 obtain eight decoded values corresponding to the input signals (Vx and Vy). The values of the low order three bits of the decoded values of the eight two-dimensional decoders 41 to 48 are 000 to 111. The two-dimensional decoders 41 to 48 are recorded information assuming means that assume recorded data and determine virtually recorded information. For example, the uppermost decoding circuit 41 corresponds to the case that the low order three bits of the input signal are 000. The two-dimensional decoder 31 decodes data with an assumption that the low order three bits are 000.

Figure 7:
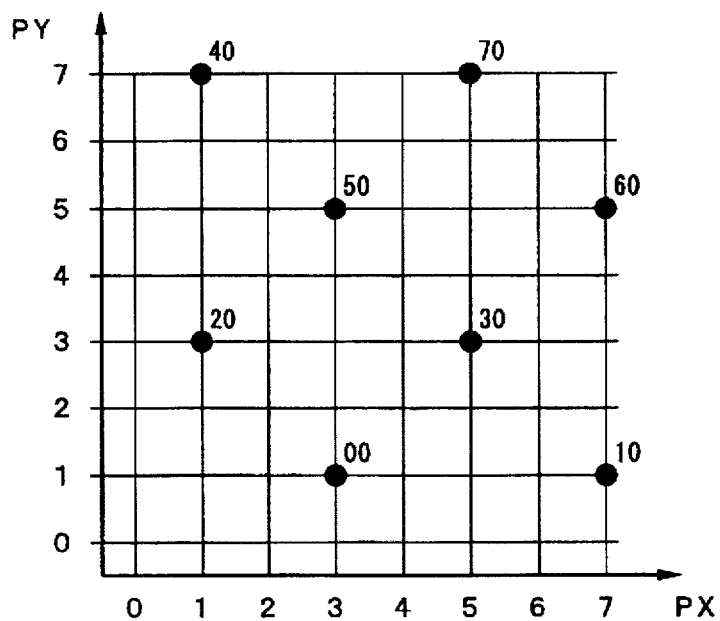
FIG. 7 is a schematic diagram showing mapping of recorded information in the case that low order three bits are 000.
Figure 8:
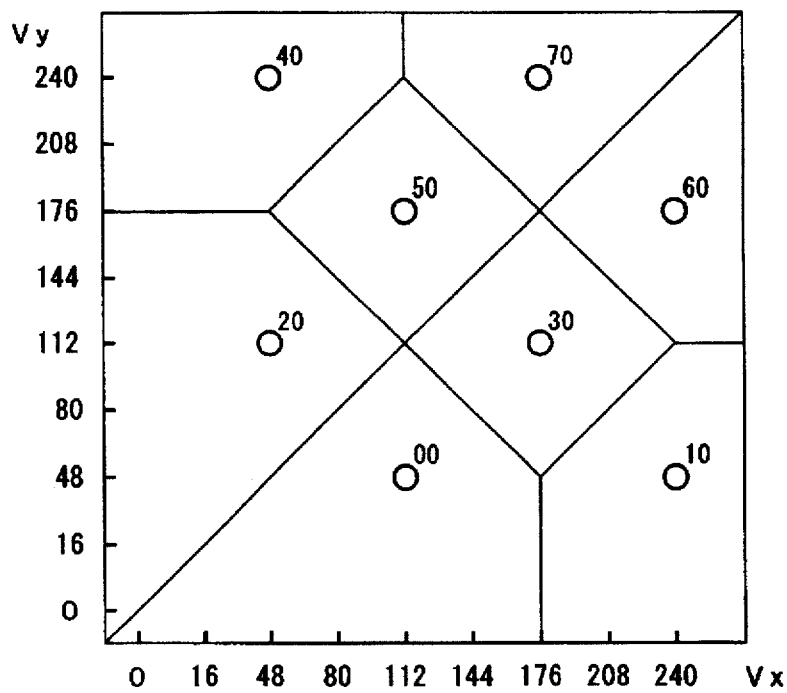
FIG. 8 is a schematic diagram showing a two-dimensional decoding region in the case that low order three bits are 000.

There are eight ways of data of which low order three bits are 000. FIG. 7 shows a map of which only the eight signals are extracted. As is clear from FIG. 7, eight ways of recorded data of which low order three bits are 000 are set so that each recorded data is maximumly spaced apart from each other on the mapping two-dimensional plane. In the case that it is known that the low order three bits of recorded data is 000, when the reproduced signals Vx and Vy are separated with threshold values on the two-dimensional plane of which each signal is sufficiently spaced apart from each other, high order three bits can be decoded. In other words, a decoding region of data whose low order three bits are 000 is formed with the threshold values represented by lines. As shown in FIG. 8, when signals Vx and Vy are decoded corresponding to the determination of the threshold values on the two-dimensional plane, since the distance between threshold values is sufficiently large, even if there are distortion and noise to some extent, the high order three bits can be decoded.

Figure 9A:
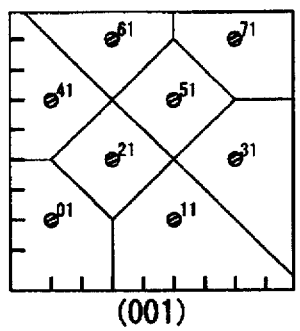
FIGS. 9A to 9G are schematic diagrams showing a two-dimensional encoding class in the case that the low order three bits are in the range from 001 to 111.

Likewise, the second uppermost two-dimensional decoder 42 decodes data with an assumption that the low order three bits of the recorded data are 001. When the lower order three bits of the recorded data are 001, as with the case of that the low order three bits are 000, information points corresponding to the high order three bits have been set so that the distance thereof is maximumly spaced apart from each other. Thus, with the two-dimensional decoder 42 of which threshold values are set on the two-dimensional plane as shown in FIG. 9A, values of high order three bits can be obtained.

Figure 9B:
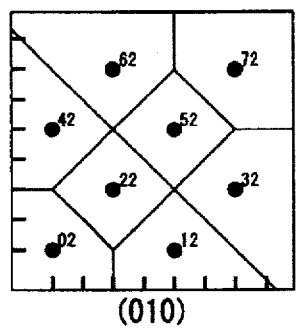
Figure 9C:
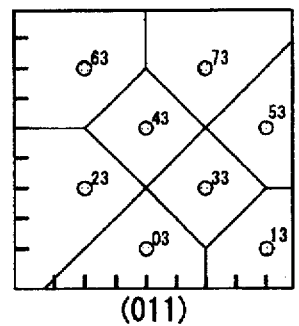
Figure 9D:
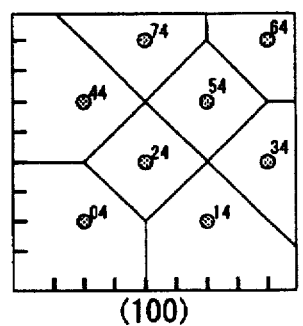
Figure 9E:
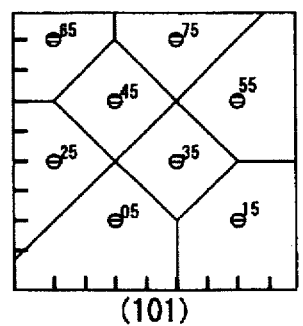
Figure 9F:
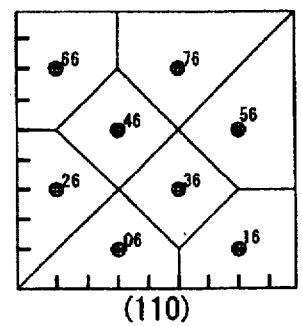
Figure 9G:
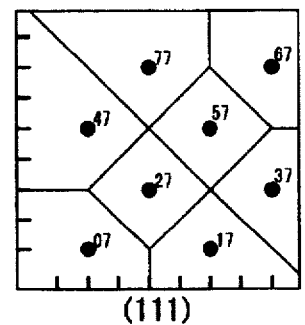

FIG. 9B shows a decoding region of the two-dimensional decoder 43 corresponding to the case that the low order three bits are 010. FIG. 9C shows a decoding region of the two-dimensional decoder 44 corresponding to the case that the low order three bits are 011. FIG. 9D shows a decoding region of the two-dimensional decoder 45 corresponding to the case that the low order three bits are 100. FIG. 9E shows a decoding region of the two-dimensional decoder 46 corresponding to the case that the low order three bits are 101. FIG. 9F shows a decoding region of the two-dimensional decoder 47 corresponding to the case that the low order three bits are 110. FIG. 9G shows a decoding region of the two-dimensional decoder 48 corresponding to the case that the low order three bits are 111.

Thus, since two-dimensional decoders are disposed corresponding to all combinations of low order three bits, unless the influences of noise and distortion are too large, one of these eight decoders 41 to 48 can output correct data. However, it is uncertain which of these decoders 41 to 48 outputs correct data. To solve this problem, the TLT decoder 33 assumes that all the decoders 41 to 48 output correct data and performs processes for all the two-dimensional decoders 41 to 48.

Estimated value calculating circuits 51 to 58 are connected to outputs of the eight two-dimensional decoders 41 to 48. The estimated value calculating circuits 51 to 58 are reproduced signal estimating means that estimate amplitudes of reproduces signals corresponding to virtually recorded information. Decoded data of high order three bits is supplied to the eight estimated value calculating circuits 51 to 58. The eight estimated value calculating circuits 51 to 58 are disposed corresponding to all combinations of low order three bits of data. Each estimated value calculating circuit obtains all of six-bit data recorded in one pit. With the six-bit data, each estimated value calculating circuit can calculate the values of reproduced signals that are completely free of a random error due to noise and so forth. These value are referred to as estimated values (Vx' and Vy').

Figure 10:
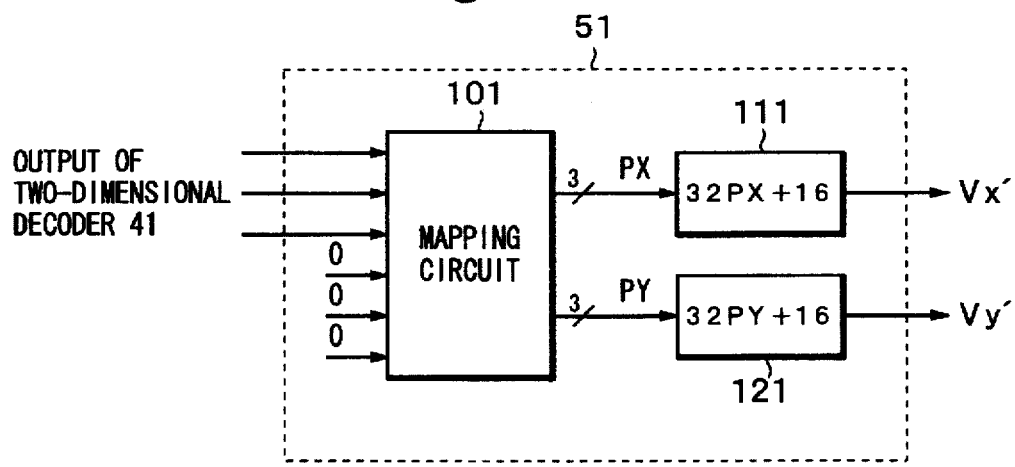
FIG. 10 is a block diagram showing an example of an estimated value calculating circuit of the TLT decoder.

FIG. 10 shows an example of which the estimated value calculating circuit 51 can be most easily accomplished. In FIG. 10, three-bit output data of the two-dimensional decoder 51 is supplied to a mapping circuit 101. The mapping circuit 101 outputs pit edge position data (PX and PY) of which the low order three bits are (0, 0, and 0). The mapping circuit 101 has the same function as the mapping circuit 1. The mapping circuit 101 can be accomplished by a memory IC or the like. With the pit edge positions PX and PY, calculating circuits 111! and 121 perform the calculations expressed by Formulas (1) and (2) so as to obtain estimated values Vx' and Vy' of reproduced signals.

Figure 11:
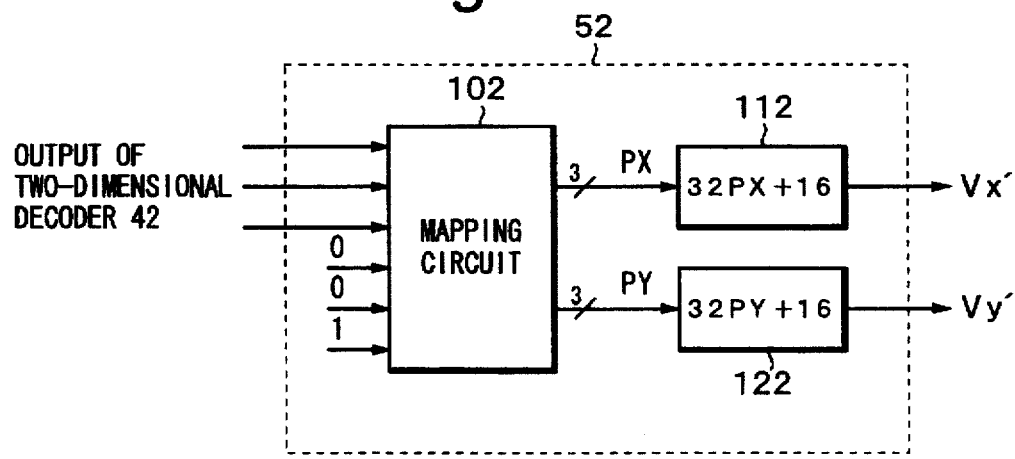
FIG. 11 is a block diagram showing an example of an estimated value calculating circuit of the TLT decoder.

The other estimated value calculating circuits 52 to 58 have the same structure as the estimated value calculating circuit 51. By changing input patterns of low order three bits to the mapping circuit, these estimated value calculating circuits 52 to 58 can be accomplished. FIG. 11 shows an example of the most simplest structure of the estimated value calculating circuit 42 of which low order three bits are (0, 0, and 1). As with the estimated value calculating circuit 41, each of the estimated value calculating circuits 52 to 58 is composed of a mapping circuit 102 and calculating circuits 112 and 122.

Subtracting circuits 61 to 68 calculate the differences between eight ways of estimated values (Vx' and Vy') and real reproduced signals (Vx and Vy). The subtracted results are input to square calculating devices 71 to 78. The square calculating devices 71 to 78 output error powers E0, E1, E2, E3, E4, E5, E6, and E7. The subtracting circuits 61 to 68 and the square calculating devices 71 to 78 are an example of a distance calculating means that calculates the distances between the estimated reproduced signals and real reproduced signals. In other words, the calculating devices 71 to 78 obtain error powers corresponding to the following formula.

$$\text{Error power} = (Vx - Vx')^2 + (Vy - Vy')^2$$

The signals obtained as error powers are proportional to energy of "deviation" between real reproduce signals and estimated values. As described above, only one of eight two-dimensional decoders 41 to 48 assumes correct low order three bits. Thus, only one of estimated value calculating circuits outputs correct estimated values (Vx' and Vy'). When the influence of noise is ignored, it is considered that correct estimated values are most close to reproduced signals. Thus, unless there is an influence of noise, one of eight square calculating devices 71 to 78 that outputs the minimum error power is selected. It can be supposed that when an output signal of the corresponding two-dimensional decoder is determined, a decoded output with the maximum likelihood can be obtained. However, actually, there is always influence of noise. When a reproduced signal at a moment is decoded, if noise with a large amplitude enters the signal at the time, a decoding error takes place.

To solve such a problem, in the embodiment of the present invention, eight error powers E0 to E7 are observed with several samples that chronologically differ from each other. One of these error powers E0 to E7 that has the maximum likelihood is considered as a decoded output. With the decoded output, noise is removed. In this embodiment, when data is recorded, a convolutional code is added thereto. Thus, the error power calculated by the reproduced signal is shown on a trellis diagram as shown in FIG. 12.

Figure 12:
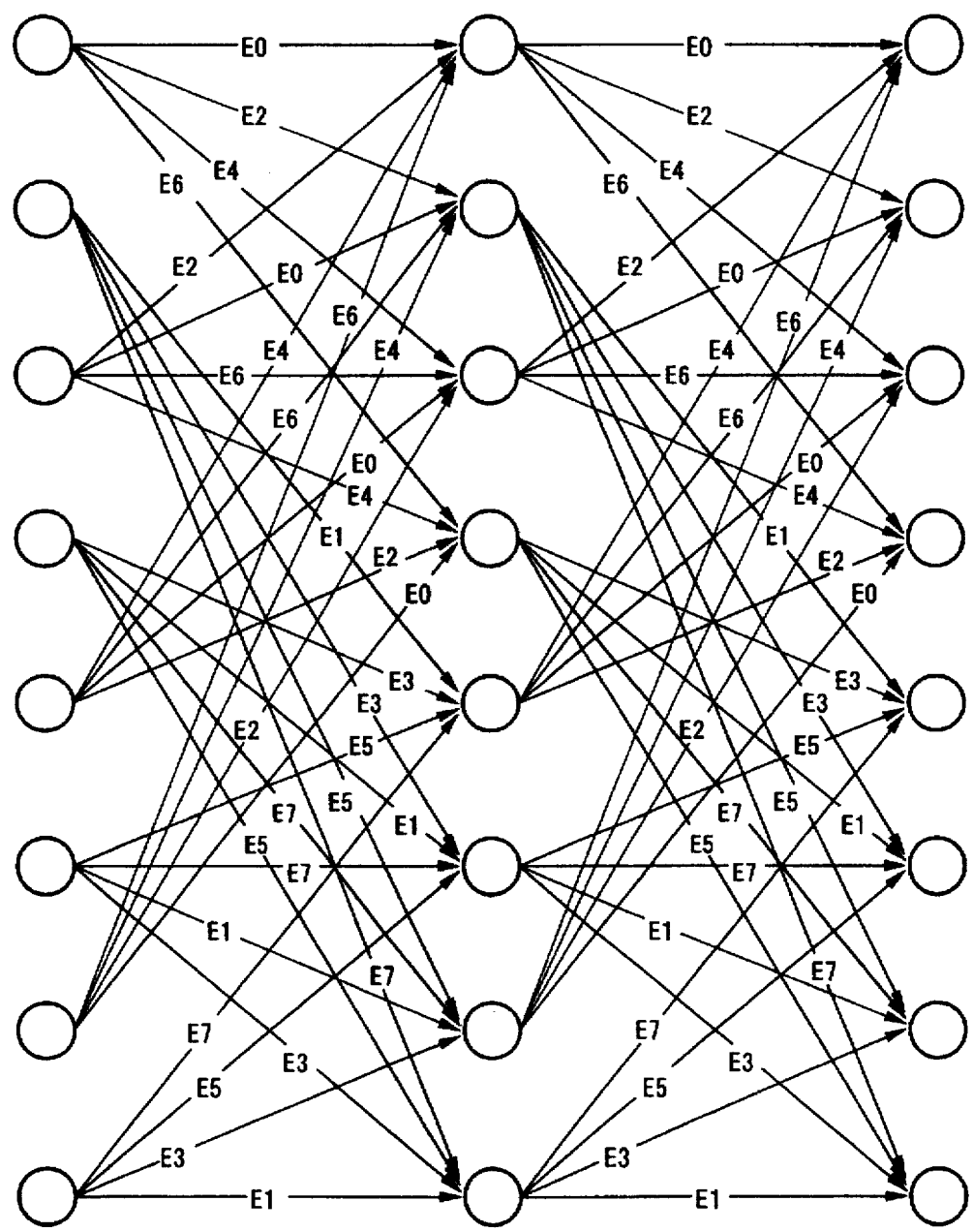
FIG. 12 is a trellis diagram for explaining a Viterbi decoding circuit of the TLT decoder.

Assuming that data with error power E0 in the upper left state has been recorded in FIG. 12, the next data has error power E0, E2, E4, or E6. Thus, it is clear that other values are not obtained. Since possible paths are restricted as shown in FIG. 12, a path is selected in such a manner that the sum of error powers becomes minimum. Thus, even if a large noise enters a particular sample, a square characteristic calculating device with the maximum likelihood can be determined.

In the structure shown in FIG. 6, the Viterbi decoding circuit 80 selects a path with the minimum cumulative value of error powers from possible paths. When such a path has been selected, the high order three bits of recorded data are determined. The low order three bits of the recorded data is determined with the output data of the two-dimensional decoder corresponding to the path. With such a process, the Viterbi decoding circuit 80 outputs final decoded values of six bits.

In the embodiment, the most simplest structure of the estimated value calculating circuits 51 to 58 was described. In other words, in this structure, it was assumed that reproduced signals are ideal (namely, completely free of signal distortion). However, in a real optical disc, the shape of each pit may vary depending on its size. Thus, recorded data of pits causes reproduced signal to be distorted. When the reproduced signal is distorted, it deviates from the ideal value. Thus, as with the case that noise is entered, when data is decoded, an error tends to take place.

To decode a signal in such a manner that the influence of such a signal distortion is removed, another embodiment of the present invention will be described. To prevent the signal distortion, estimated value calculating circuits 51 to 58 shown in FIG. 13 are used instead of those in FIG. 6.

Figure 13:
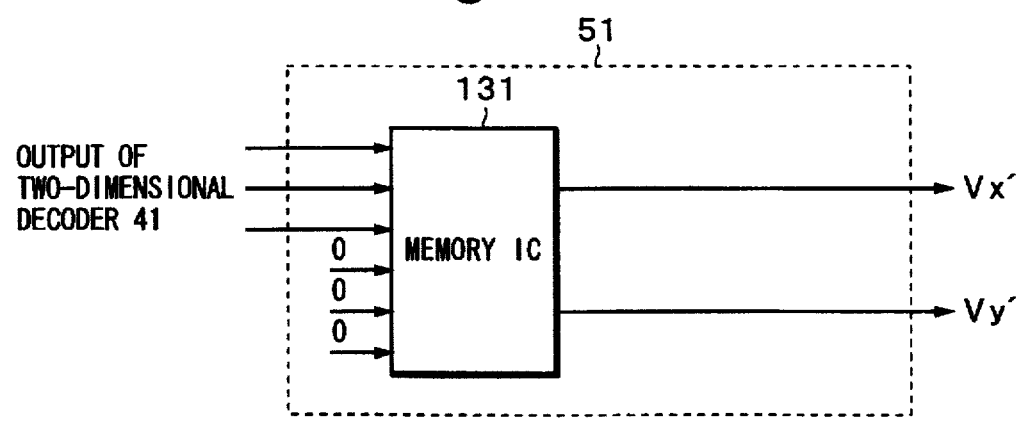
FIG. 13 is a block diagram showing another example of the estimated value calculating circuit of the TLT decoder.

FIG. 13 shows the structure of only the estimated value calculating circuit 51. However, the structures of the other estimated value calculating circuits 52 to 58 are the same as that of the estimated value calculating circuit 51. Three bits of output data of the two-dimensional decoder 41 is supplied to a memory IC 131. The memory IC 131 outputs estimated values Vx' and Vy'. Since the memory IC 131 can store any estimated values corresponding to all combinations of six bits of data recorded to each pit, the memory IC 131 can handle various signal distortions that take place on the real optical discs. In addition, when the memory IC 131 is a rewritable memory, while data is being reproduced from a disc, the values of the data can be varied. In this case, more significant effects than the above-described embodiment can be accomplished.

Figure 14:
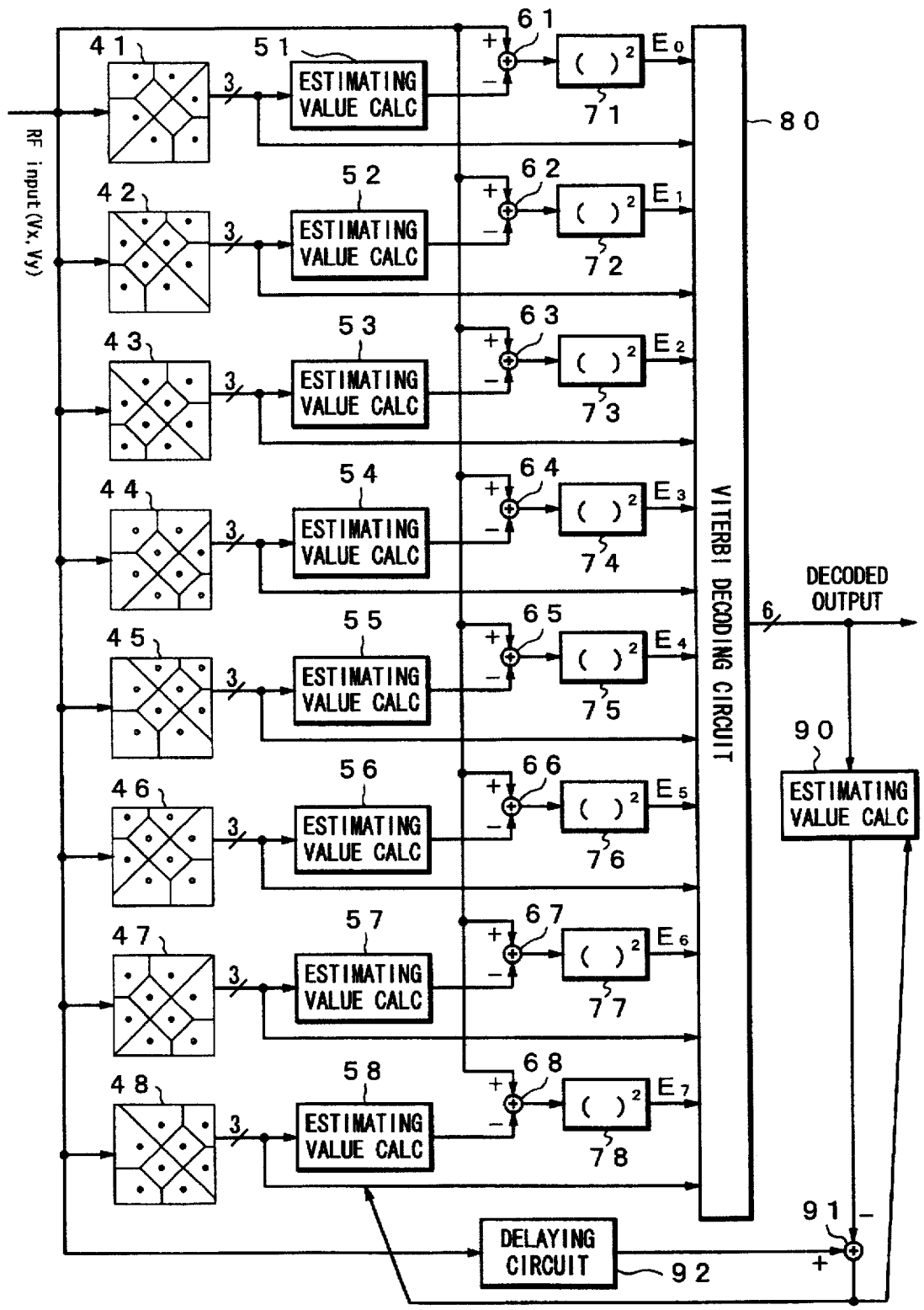
FIG. 14 is a block diagram showing a TLT decoder according to another embodiment of the present invention.

FIG. 14 shows another embodiment of which values stored in a memory IC of an estimated value calculating circuit are varied while data is being reproduced. The estimated value calculating circuit 90 calculates estimated values with decoded output data. A subtracting circuit 91 calculates the differences between the estimated values and the reproduced signals delayed by a delaying circuit 92. Thus, the contents of the memory ICs of the estimated value calculating circuits 51 to 58 and the estimated value calculating circuit 90 are updated so that the output data of the subtracting circuit 91 gradually decreases. In the embodiment shown in FIG. 14, influence of distortion that chronologically varies can be effectively prevented.

In this embodiment, by modulating either the front edge or rear edge of each pit, a digital signal can be recorded as multiple values. In the present invention, a writable record medium such as an optical disc can be used as well a read-only record medium.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A digital signal reproducing apparatus for reproducing a multiple-record medal recorded on a record medium, comprising:

a plurality of recorded information assuming means for assuming record information and determining virtually recorded information;

reproduced signal estimating means for estimating the amplitude of a reproduced signal corresponding to the virtually recorded signal;

distance calculating means for calculating the distance between the estimated reproduced signal and a real reproduced signal; and decoding means for calculating the sum of a plurality of outputs of said distance calculating means, the plurality of outputs chronologically varying, detecting the minimum output from the sum, and outputting reproduced data corresponding to the detected result.

2. The apparatus as set forth in claim 1, wherein said plurality of recorded information assuming means assume only part of recorded information, and wherein said decoding means obtains information that has not been assumed corresponding to the reproduced signal.

3. The apparatus as set forth in claim 1, wherein said reproduced signal estimating means calculates the difference between the output of said decoding means and the reproduced signal decoded by said decoding means and updates the estimated value corresponding to the difference.

4. A digital signal reproducing method for reproducing a multiple-value signal recorded on a record medium, comprising the steps of:

assuming recorded information and determining virtually recorded information;

estimating the amplitude of a reproduced signal corresponding to the virtually recorded information;

calculating the difference between the estimated reproduced signal and a real reproduced signal; and calculating the sum of distances that chronologically differ from each other and that have been calculated, detecting the minimum value from the sum, and outputting reproduced data corresponding to the detected result.

* * * * *

UNITED STATES PATENT AND TRADEMARK OFFICE
CERTIFICATE OF CORRECTION

PATENT NO. : 5,729,518
DATED : March 17, 1998
INVENTOR(S) : SEIJI KOBAYASHI

It is certified that error appears in the above-identified patent and that said Letters Patent is hereby corrected as shown below:

In Col. 9, line 43, replace "multiple-record medal" with --multiple-value signal--

Signed and Sealed this

Twenty-seventh Day of October, 1998

Attest:

BRUCE LEHMAN

Attesting Officer        Commissioner of Patents and Trademarks